(No Model.)

F. MANKEY.
PROCESS OF MANUFACTURING PANEL AND WOOD TRIMMINGS.

No. 325,351. Patented Sept. 1, 1885.

WITNESSES:

INVENTOR:
Frederick Mankey

UNITED STATES PATENT OFFICE.

FREDERICK MANKEY, OF WILLIAMSPORT, PENNSYLVANIA.

PROCESS OF MANUFACTURING PANEL AND WOOD TRIMMINGS.

SPECIFICATION forming part of Letters Patent No. 325,351, dated September 1, 1885.

Application filed July 22, 1885. (No model.)

*To all whom it may concern:*

Be it known that I, FREDERICK MANKEY, a citizen of the United States, residing at Williamsport, in the county of Lycoming and State of Pennsylvania, have invented a new and useful Improvement in Processes for Ornamenting the Surface of Wood or Analogous Material, of which the following is a specification.

Figure 1:
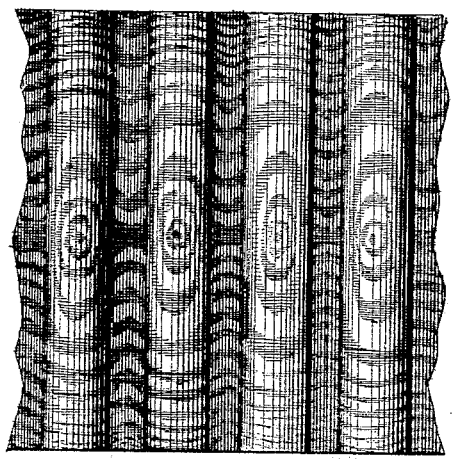
Figure 2:
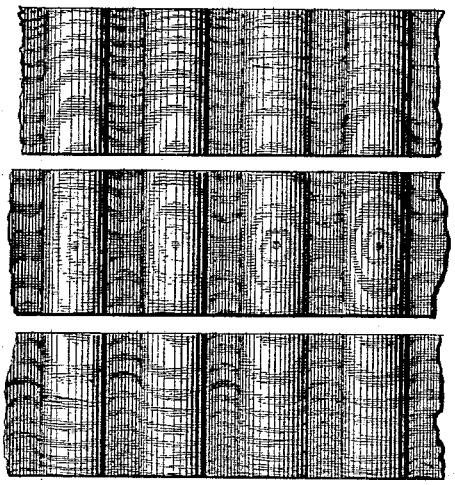
Figure 3:
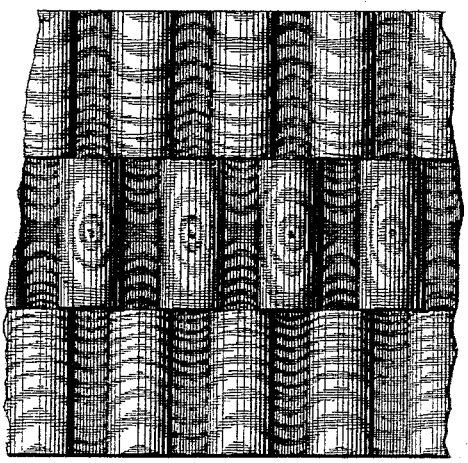

In the accompanying drawings, Figure 1 is a view of a piece of surface cross-cut wood. Fig. 2 is a view of the same after it has been cut into pieces at an angle to the indentations and recesses shown in Fig. 1; and Fig. 3 is a view of the strips or pieces when put together so as to form a surface with a new configuration.

My invention is a new process of making ornamental surfaces, particularly in wood.

For convenience I will describe the process when applied to wood, though it is equally applicable to any substance capable of receiving a cross-cut surface.

I take a piece of wood, either hard or soft, and cut it with a series of cutters or saws, but preferably with a rotary cutter, at an angle to the grain, so as to form upon it regular depressions and elevations, thus bringing out the grain more distinctly. I prefer to do this work with a rotary cutter; but I do not confine myself to this means of accomplishing the result. Any mode of forming regular depressions and elevations at an angle to the grain may be used. The next step in the process is to saw or cut the wood thus surfaced into strips or pieces at an angle to the line of the depressions and elevations already produced in the surface of the wood. The third and final step in the process is fastening together the strips into which the surface-wood has been cut or sawed. This is done by putting the pieces together in any manner desired, so that the elevations and depressions shall not correspond in the same way as before the wood was cut into strips.

In this way an infinite variety of new surface configurations and designs may be formed.

I claim—

The herein-described improved process of ornamenting the surface of wood or analogous material, which consists in first producing in the surface of said material a series of elongated recesses or depressions transversely, or at an angle to the grain; and, secondly, dividing said material into strips, blocks, or pieces by cutting it at an angle to said indentations or recesses; and, thirdly, uniting or securing said strips together, so as to form a surface having a new configuration.

FREDERICK MANKEY.

Witnesses:
   FORREST W. WEST,
   C. H. MARPLE.